United States Patent Office 2,893,842
Patented July 7, 1959

2,893,842

PRODUCTION OF ELEMENTAL BORON

Wilhelm J. Kroll, Corvallis, Oreg., and Nelson P. Nies, Altadena, and Edgar W. Fajans, Los Angeles, Calif., assignors, by mesne assignments, to United States Borax & Chemical Corporation No Drawing. Application October 27, 1954
Serial No. 465,148

8 Claims. (Cl. 23—209)

This invention is concerned generally with the economical production of elemental boron of relatively high purity. More particularly, the invention provides methods for treating elemental boron to increase its purity, and for utilizing such upgrading procedures to improve the overall production of elemental boron.

A number of processes have been described for producing elemental boron, of which two may be mentioned as typical; electrolysis at high temperature of various boron-containing melts, and the direct chemical reaction, described by Moissan, between boric oxide and magnesium. The immediate product of such processes is commonly leached thoroughly in hot acid, leading to a technical grade of elemental boron that frequently contains 8% or more of impurities.

A primary object of the present invention is to provide means by which unleachable impurities can be removed from such technical elemental boron. By thus permitting the upgrading of elemental boron, the invention leads to a final product of increased purity, and at the same time typically permits the procedure for producing the initial crude elemental boron to be carried out in a less critical and more economical manner.

In accordance with the invention, the elemental boron to be upgraded is heated in the presence of a reactant composition that is, preferably, soluble in acid solution, that is substantially inert with respect to elemental boron, and that converts the unleachable impurities primarily into leachable form, a portion of the impurities perhaps being volatilized. After such treatment the solid residue may be leached with hot acid, thoroughly washed and filtered to remove the converted impurities and any remaining reactant.

The described roasting and subsequent leaching operations are preferably carried out after the initially produced elemental boron has been treated by conventional methods, such as leaching in hot acid, to reduce the impurities. However, such initial purification may not need to be as thorough as would normally be required, and may even be largely or wholly omitted.

The invention is particularly effective in reducing contamination of elemental boron by oxygen and in removing the appreciable content of magnesium that is typically present in elemental boron produced by the Moissan process, or by certain electrolytic processes, and that is not directly removable by conventional leaching operations.

Reagents that may be utilized in accordance with the invention comprise a wide variety of fluorides, including, for example, fluorides of the alkali metals, of hydrogen and of elements such as boron from the third group of the Periodic Table. Particularly effective results have been obtained with fluorides containing boron, hydrogen, potassium and combinations of those elements. Typical of such reagents are KF, HF, $BF_3$, $KHF_2$, and $KBF_4$. Combinations of such reagents appear in certain instances to be more effective than an equivalent amount of either of the reagents alone. A preferred combination of that type, which is mentioned as an illustration, comprises mixtures of the two reagents $KBF_4$ and $KHF_2$.

The temperature required for the described process is not particularly high, excellent results having been obtainable at 500° C. or less. However, the effectiveness of the treatment seems to increase somewhat from about 300 to at least about 1000° C. At the reaction temperature the reactant composition may be either a solid, a liquid, or a gas, or may include more than one phase, depending upon the temperature and the particular ingredients selected. For convenience of reference, the operation just described will be referred to as roasting.

The roasting reaction is preferably carried out in a vessel capable of being evacuated, to facilitate elimination of oxygen or other gases capable of reacting with elemental boron. The reaction may be carried out in vacuum, aside from any gaseous phase of the reactant composition, but it is usually more conventient to fill the reaction vessel with a gas that is inert with respect to elemental boron. Such an inert atmosphere may be provided by one of the noble gases, such as helium or argon, or by a gas providing reducing action, such as hydrogen, for example.

The invention may be carried out effectively over a considerable range of proportions of reagent to the elemental boron to be treated, the preferred proportion depending in any given instance upon such factors as the initial purity of the boron and the effectiveness and unit cost of the particular reagent or combination of reagents used. In general, it has been found that the purity of the final product tends to increase with the proportion of reagent used, up to a ratio of about unity. On the other hand, relatively small proportions of reagents, such as 5%, may produce significant improvements in purity. Particularly if maximum obtainable purity is not required, treatment with 10 to 20% of reagent may be found desirable in many instances.

After the step of roasting the impure elemental boron in the presence of a reagent of the type described, the products of the reaction and any remaining reactant may be removed in any suitable manner. It is preferred to employ the same type of treatment that has typically been employed previously for removal of the gross impurities from freshly prepared boron. A preferred form of such treatment, when the reactant composition is either volatile or soluble in acid solution, as is preferred, comprises initial extraction of materials soluble in water, followed by extended boiling, for example for 3 hours, with about 20% hydrochloric acid, with subsequent thorough washing and drying. It is noteworthy that such a leaching step, carried out after the described roasting treatment of the impure elemental boron, removes impurities that were not removable by the same type of leaching previous to the roasting operation.

As already indicated, the process of the invention is particularly effective for removing the magnesium that is typically found as a primary contaminant of elemental boron prepared by the Moissan process. In fact, the ease and economy with which such magnesium may be removed in accordance with the present invention has led to an important improvement in the Moissan process itself. The rather extensive literature on the Moissan process indicates that maximum purity of the resulting elemental boron is obtained when the weight ratio of $B_2O_3/Mg$ is approximately equal to 3. However, the total amount of impurities other than magnesium in the initially produced elemental boron (after purification by previously available processes) can be significantly reduced by carrying out the Moisan reaction with a weight ratio considerably less than 3. For example, the weight ratio of $B_2O_3/Mg$ may usefully be 1.5 or less, and is preferably in the neighborhood of 2. After conventional leaching, the resulting elemental boron then may contain a larger proportion of total impurities than does the product of the conventional Moissan process; but the impurities other than magnesium constitute a smaller fraction of the total, and are also smaller in absolute amount. Treatment of such product by the upgrading process of the present invention substantially eliminates magnesium as an impurity (in spite of its initially greater concentration) and also reduces the total concentration of impurities other than magnesium. Moreover, contaminating oxygen appears to be more readily removable from Moissan boron when the ratio of $B_2O_3/Mg$ in the starting material is appreciably less than 3. The resulting overall process is accordingly particularly effective and economical for producing elemental boron of relatively high purity.

The following detailed procedure for initial preparation of elemental boron by means of the Moissan reaction is described as an illustration. Boric oxide and substantially pure magnesium metal turnings are mixed in a ratio of 2:1 and heated in a steel container. As soon as the reaction is complete, the container is removed from the oven and cooled. The reaction product is then broken up, covered with strong acid such as 1:1 technical hydrochloric acid, and boiled until no large particles remain, which typically requires several hours. The remaining solids are thoroughly washed by decantation with enough water to dissolve any remaining boric oxide, and are separated by filtration. The leaching in boiling acid and washing are then repeated, filtration and drying finally yielding a solid product that will pass a 100 mesh sieve. The described process yields typically a solid product that comprises approximately 10% of the total initial mixture. A typical product was found on analysis to consist of 89.1% boron, 7.8% magnesium and 3.1% impurities other than magnesium. Whereas the invention may be used for upgrading boron of moderate purity from any source, elemental boron prepared by the Moissan process, especially when carried out with the ratio $B_2O_3/Mg$ appreciably less than 3, is particularly well adapted for purification in accordance with the invention.

The upgrading process of the present invention may be carried out by many different detailed procedures, the particulars of the following described procedures herein being presented for illustration only. The treatment is carried out in a suitable vessel from which oxygen can be substantially wholly excluded, either by evacuation of the vessel, or by filling it with an atmosphere that is substantially inert with respect to elemental boron. When the reagent to be used is a solid at normal temperatures, as is ordinarily the case, it is preferably first mixed with the boron to be treated, both components being in relatively finely divided form, and the mixture is then filled into the reaction vessel. That vessel may, for example, comprise an elongated cylinder with a cover at its upper end provided with a sealing gasket and means for keeping the gasket cool while the lower part of the vessel is heated. The reaction mixture may be filled directly into such a vessel, but is preferably contained in a boat that is insertable into the main vessel. The vessel is then typically evacuated and flushed with a suitable inert gas several times. The vessel may then be finally evacuated or filled with any desired inert gas and heated to the selected reaction temperature. That temperature, which is variable from a few hundred degrees centigrade to 1000° C. or more, may be obtained by any convenient method of heating. It is preferred to raise the temperature of the vessel to the reaction temperature as rapidly as may be convenient, and to cool it relatively rapidly after completion of the reaction. The reaction time may be relatively short, satisfactory results being obtained in many cases by roasting for only half an hour or less. Roasting times longer than about one hour do not appear to produce further improvement in the quality of the final product.

The following table gives illustrative examples of typical results obtained with various proportions of selected reactants, the amount of each reactant being indicated (except in runs K and L) as a weight percentage of the elemental boron treated. All of the indicated runs, which are identified by letters for convenience, were carried out on equivalent portions of the same batch of initially purified elemental boron the preparation of which has been described above and which was found on analysis to contain 89.1% B, 7.8% Mg and 3.1% impurities other than magnesium. In runs K and L the respective gaseous reactants $BF_3$ and HF were provided by thermal decomposition of $KBF_4$ and $KHF_2$, respectively, which were introduced into the reaction vessel in a special boat separate from the boron to be treated. The vessel was then pumped down, flushed twice with argon, and finally evacuated to a pressure of about 0.4 mm. of mercury. In runs A to J the roasting was carried out in an atmosphere of argon. In all runs shown the materials were roasted at the typical temperature of 1000° C. for approximately 40 minutes. The resulting product, after leaching as already described, was analyzed for boron and for magnesium, the results of that analysis being given in the table.

It will be seen from the table that some of the illustrative reagents shown, notably $KBF_4$, $KHF_2$ and mixtures thereof, are particularly effective in removing magnesium; while others, typified by KF, are more effective in removing impurities other than magnesium. Mixtures of reagents selected from those two groups tend to combine the advantages of both, as indicated illustratively by run J.

Table

| Run | Reagent Composition | | | | | Product | | |
|---|---|---|---|---|---|---|---|---|
| | $KBF_4$ | $KHF_2$ | KF | $BF_3$ | HF | Percent B | Percent Mg | Percent Other |
| A | 50 | | | | | 95.5 | 2.9 | 1.6 |
| B | | 50 | | | | 96.3 | 2.3 | 1.4 |
| C | 100 | | | | | 96.3 | 1.6 | 2.1 |
| D | | 100 | | | | 96.5 | 1.4 | 2.1 |
| E | 50 | 50 | | | | 96.7 | 0.9 | 2.4 |
| F | 100 | 100 | | | | 97.0 | 0.7 | 2.3 |
| G | 200 | 200 | | | | 93.9 | 0.6 | 5.5 |
| H | | | 50 | | | 94.0 | 5.2 | 0.8 |
| I | | | 100 | | | 94.3 | 4.6 | 1.1 |
| J | 50 | 50 | 50 | | | 97.0 | 1.3 | 1.7 |
| K | | | | Gas | | 94.1 | 3.5 | 2.4 |
| L | | | | | Gas | 91.4 | 6.2 | 2.4 |

We claim:

1. The process for removing contaminating magnesium from elemental boron produced by reaction of boron oxide and magnesium, said process comprising leaching the elemental boron in hot aqueous acid solution to remove any magnesium that is leachable in such solution, then heating the contaminated elemental boron at a temperature between about 300° C. and about 1000° C. in the presence of between about 10% and about 200% of its weight of a reagent composition selected from the group consisting of boron fluoride, alkali metal fluorides, anhydrous gaseous hydrogen fluoride and combinations of the same, to transform non-leachable magnesium to leachable form, and then leaching the product in hot aqueous acid solution to remove the converted magnesium.

2. The process for producing elemental boron containing more than 91% boron, said process comprising reacting boric oxide with at least about one half its weight of magnesium and leaching the reaction product in hot aqueous acid solution to produce crude elemental boron containing a relatively large proportion of magnesium that is non-leachable in such solution and containing a relatively small proportion of impurities other than magnesium, then heating the crude elemental boron at a temperature between about 300° C. and about 1000° C.

in the presence of between about 10% and about 200% of its weight of a reagent composition selected from the group consisting of boron fluoride, alkali metal fluorides, anhydrous gaseous hydrogen fluoride and combinations of the same, to transform non-leachable magnesium to leachable form, and then leaching the product in hot aqueous acid solution to remove the converted magnesium.

3. The process for removing contaminating oxygen from elemental boron produced by electrolysis of a boron-containing melt, said process comprising leaching the elemental boron in hot aqueous acid solution to remove any oxygen that is leachable in such solution, then heating the contaminated elemental boron at a temperature between about 300° C. and about 1000° C. in the presence of between about 10% and about 200% of its weight of a reagent composition selected from the group consisting of boron fluoride, alkali metal fluorides, anhydrous gaseous hydrogen fluoride and combinations of the same, to transform non-leachable oxygen to leachable form, and then leaching the product in hot aqueous acid solution to remove the converted oxygen.

4. The process defined in claim 1 and in which the boron is heated in the presence of potassium acid fluoride.

5. The process defined in claim 1 and in which the boron is heated in the presence of potassium fluoborate.

6. The process defined in claim 1 and in which the boron is heated in the presence of potassium fluoride.

7. The process defined in claim 1 and in which the boron is heated in the presence of boron fluoride.

8. The process defined in claim 1 and in which the boron is heated in the presence of anhydrous gaseous hydrogen fluoride.

References Cited in the file of this patent

UNITED STATES PATENTS 2,465,989    Sowa ------------------ Apr. 5, 1949

OTHER REFERENCES

Moissan, "Comptes Rendus," vol. 114, pages 392–397 (1892).

Thurston, "Journal of Chemical Education," vol. 6, pages 550–552 (1929).

Comey et al., "A Dictionary of Chemical Solubilities," 1921, page 97.

Mellor, "A Comprehensive Treatise on Inorganic and Theoretical Chemistry," 1922, vol. 2, page 138.